United States Patent
Ciaramella et al.

(10) Patent No.: US 8,036,536 B2
(45) Date of Patent: Oct. 11, 2011

(54) OPTICAL TRANSMITTER, OPTICAL NETWORK AND METHOD FOR COMPENSATION OF POLARIZATION MODE DISPERSION

(75) Inventors: Ernesto Ciaramella, Rome (IT); Emma Matarazzo, Avellino (IT)

(73) Assignee: Ericsson AB, Stockholm (SE)

( * ) Notice: Subject to any disclaimer, the term of this patent is extended or adjusted under 35 U.S.C. 154(b) by 702 days.

(21) Appl. No.: 12/126,419

(22) Filed: May 23, 2008

(65) Prior Publication Data

US 2008/0292321 A1    Nov. 27, 2008

(30) Foreign Application Priority Data

May 24, 2007    (EP) .................. PCT/EP2007/055057

(51) Int. Cl.
*H04B 10/00* (2006.01)
*H04B 10/12* (2006.01)
*H04B 10/04* (2006.01)

(52) U.S. Cl. ........ 398/147; 398/136; 398/152; 398/158; 398/159; 398/161; 398/184

(58) Field of Classification Search ................. None
See application file for complete search history.

(56) References Cited

U.S. PATENT DOCUMENTS

| | | | |
|---|---|---|---|
| 6,459,830 B1 | 10/2002 | Pua et al. | |
| 6,483,620 B1 * | 11/2002 | Epworth et al. | 398/29 |
| 7,067,795 B1 * | 6/2006 | Yan et al. | 250/225 |
| 7,106,979 B1 * | 9/2006 | Taylor | 398/209 |
| 2004/0202480 A1 * | 10/2004 | Weid et al. | 398/147 |

FOREIGN PATENT DOCUMENTS

| | | |
|---|---|---|
| EP | 0984571 A2 | 3/2000 |
| GB | 2307368 A | 5/1997 |

OTHER PUBLICATIONS

Ciaramella, E. "PMD-Induced Impairments in Polarization-Interleaved WDM Systems." IEEE Photonics Technology Letters, vol. 15, No. 2, Feb. 2003, pp. 227-229.

Ciaramella, E. "Theoretical Evidence of Dynamical Limitations in Practical Single-Stage PMD Compensators." IEEE Photonics Technology Letters, vol. 16, No. 8, Aug. 2004, pp. 1843-1845.

Ciaramella, E. "Dynamical Limitations of Single-Stage PMD Compensators." Optical Networks and Technologies, Ed. Kitayama et al., Springer Boston: 2005, pp. 517-523. ISBN 978-0-387-23177-8.

Fiorone, R. et al. "New Approach to Optical Polarisation Mode Dispersion Mitigation: Experimental Analysis of the Dynamic Performances of a Cost-Driven Device." Optical Networks and Technologies, Ed. Kitayama et al., Springer Boston: 2005, pp. 524-529. ISBN 978-0-387-23177-8.

Sunnerud, H. et al. "Polarization-Mode Dispersion in High-Speed Fiber-Optic Transmission Systems." Journal of Lightwave Technology, vol. 20, No. 12, Dec. 2002, pp. 2204-2219.

(Continued)

Primary Examiner — Ken N Vanderpuye
Assistant Examiner — Darren E Wolf
(74) Attorney, Agent, or Firm — Coats & Bennett, P.L.L.C.

(57) ABSTRACT

An optical transmitter apparatus for use in an optical communications network has a polarization dithering unit, an optical transmitter unit, and a transmission fiber. The polarization dithering unit is connected in series between an output of the optical transmitter unit and the transmission fiber.

12 Claims, 4 Drawing Sheets

OTHER PUBLICATIONS

Sunnerud, H. et al. "A Comparison Between Different PMD Compensation Techniques." Journal of Lightwave Technology, Vol. 20, No. 3, Mar. 2002, pp. 368-378.

Buchali, F. et al. "Adaptive PMD Compensation by Electrical and Optical Techniques." Journal of Lightwave Technology, Vol. 22, No. 4, Apr. 2004, pp. 1116-1126.

Pua, H. Y. et al. "An Adaptive First-Order Polarization-Mode Dispersion Compensation System Aided by Polarization Scrambling: Theory and Demonstration." Journal of Lightwave Technology, vol. 18, No. 6, Jun. 2000, pp. 832-841.

* cited by examiner

OPTICAL TRANSMITTER, OPTICAL NETWORK AND METHOD FOR COMPENSATION OF POLARIZATION MODE DISPERSION

RELATED APPLICATIONS

This application claims priority from PCT application PCT/EP2007/055057, which is entitiled, "Optical Transmitter, Optical Network and Method for Compensation of Polarization Mode Dispersion." That application was filed on May 24, 2007 and is incorporated herein by reference in its entirety.

TECHNICAL FIELD

The present invention relates generally to optical communications networks, and particularly to compensation of polarization mode dispersion.

BACKGROUND

Polarization Mode Dispersion (PMD) of transmission fibers is likely the most limiting effect for deploying high-speed optical communications systems at 40 Gbit/s per channel and above. PMD arises from random birefringence in fibers and network devices, which gives rise to a differential group delay (DGD) between the two principal states of polarization (PSPs), and manifests as random pulse distortion and performance degradation in optical fiber transmission systems. PMD is a stochastic phenomenon whose DGD value changes with time, temperature, wavelength and deployment condition.

In an ideal situation, light with different polarizations travels at the same speed in a waveguide (optical fiber). Due to random imperfections and asymmetries that cause random spreading of optical pulses, which are present in real life optical fiber, two different polarizations of light travel across the waveguide with different speeds. This phenomenon is called Polarization Mode Dispersion.

To mitigate the effect of PMD, optical systems must include some form of PMD compensation. In Wavelength Division Multiplex (WDM) systems, one such compensator for each channel must normally be employed to achieve satisfactory performance. To effectively mitigate the PMD effects, the temporal drift of the PMD characteristics forces any active compensation technique to dynamically adapt while the system is in operation and the fiber PMD evolves. A number of optical and electronic PMD compensators were proposed. Among them the solutions in the electrical domain are generally faster and more flexible, but they are intrinsically limited to low PMD. Therefore, the optical PMD compensators, which are much more complex, have larger potential as the PMD (at least in theory) can be completely compensated in the optical domain.

The basic blocks of a typical PMD compensator are a number of high-birefringence elements (e.g. Polarization Maintaining Fibers, PMF, elements), a feedback signal and an optimization algorithm that dynamically drives the PMDC.

A disadvantage of the solutions known in the art is that the effectiveness of PMD-Compensators (PMDCs) is often estimated through a static or quasi-static procedure: since the penalty depends on both input signal State Of Polarization (SOP) and the fiber PMD, one can use a PMD-emulator and fix the input signal SOP to measure the effectiveness of the PMDC. Then either SOP or PMD are changed and the PMDC optimized again (this corresponds, at the theoretical level, to the outage probability approach). In both cases, one neglects what may happen during transients from one operating condition to the next. In principle, any change of the input state of polarization (SOP) and/or of the fiber PMD corresponds to a time-dependant trajectory of the PMDC variable parameters. Therefore this quasi-static approach might be correct only if these trajectories had no discontinuity. This has been proven not true.

Most Polarization Mode Dispersion Compensators can use one out of two different compensation strategies. System impairments only depend on $|\vec{\Omega} \times \vec{s}|$ where $\vec{s}$ and $\vec{\Omega}$ are the Stokes vectors of the signal SOP and overall $1^{st}$ order PMD, respectively. Hence, a PMDC works effectively if either $\vec{\Omega}$ is parallel to $\vec{s}$ or if $|\vec{\Omega}|$ is simply minimized. If the PMDC starts in the "parallel" mode, after some time, the PMDC may have to instantaneously switch to the "minimization" mode.

Since there is a nonzero time needed for switching the PMDC and then iteratively finding the new optimum operation point, the PMDC may produce eye closure and error bursts during these time windows, which cannot be tolerated by system and network architectures.

From the PMDC it is therefore mandatory that it cannot ever use the "parallel" strategy. However this cannot be easily avoided: the signal characteristics do not allow separating these two operation modes. Thus, the usual feedback signals provide basically the same results in the two operation modes, and different types of feedback cannot be used to discriminate between the two modes. Therefore, current optical PMDCs are prone to lock to unstable conditions, and may produce ineffective compensation with low signal quality and unacceptable error bursts.

As is known in the art, a technique known as polarization scrambling, which is currently used in long-haul optical transmission systems, may not be suitable for application in compensation of polarization mode dispersion.

Hence, an improved apparatus and method for compensating polarization mode dispersion would be advantageous. Such a method and apparatus should be easily applicable to methods of compensating a broad range of PMD (including high polarization mode dispersion), as well as to situations with variable state of polarization.

SUMMARY

Accordingly, the invention seeks to preferably mitigate, alleviate or eliminate one or more of the disadvantages mentioned above singly or in any combination.

According to a first aspect of the present invention there is provided an optical transmitter apparatus for use in optical communications network comprising a polarization dithering unit connected in series between an output of an optical transmitter unit and a transmission fiber.

According to a second aspect of the present invention there is provided an optical communications network comprising at least a transmitter apparatus and a receiving apparatus, wherein the transmitter apparatus comprises a polarization dithering unit connected in series between an output of an optical transmitter unit and a transmission fiber, the network further comprises a Polarization Mode Dispersion Compensator connected between the end of the transmission fiber and an input of the receiving apparatus.

Preferably, the Polarization Mode Dispersion Compensator comprises a Polarization Controller, a delay unit and a feedback signal line that is adapted to provide to the Polarization Controller a feedback signal taken at the receiver apparatus input.

The dithering unit of the optical transmitter apparatus is adapted to modulate the state of polarization of the input signal, wherein the polarization is carried out in a way that said state of polarization modulation changes on a time-scale shorter than the time-scale over which the feedback signal of the Polarization Mode Dispersion Compensator is extracted.

According to a third aspect of the present invention there is provided a method of transmitting optical signals in an optical communications network comprising polarization dithering of the optical signals transmitted from an output of an optical transmitter unit, and sending said dithered signal to a transmission fiber.

Further features of the present invention are as claimed in the dependent claims.

The present invention beneficially allows for suppressing instabilities at the PMDC without introducing significant jitter. This solution makes PMDC really effective, by suppressing the PMDC intrinsic instabilities. Additionally it can be implemented cost effectively by simple modifications of the transmitter.

BRIEF DESCRIPTION OF THE DRAWINGS

The present invention will be understood and appreciated more fully from the following detailed description taken in conjunction with the drawings in which.

DETAILED DESCRIPTION

Figure 1:
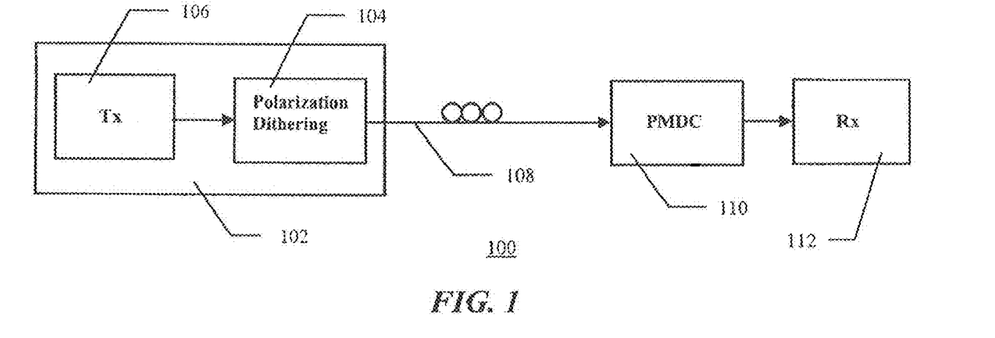
FIG. 1 is a diagram illustrating an optical communications network suitable for use in one embodiment of the present invention.

Referring to FIG. 1, an optical communications network 100 comprises an optical transmitter apparatus 102 and an optical receiver apparatus 112. For the sake of clarity, the drawings present the invention in a very schematic way with elements and lines not essential for understanding the invention omitted.

The term "transmitter" or "transmitter apparatus" used in this application relates to devices that output optical signals to the network. Examples of such devices include, but are not limited to, optical transmitters, optical amplifiers, and optical add/drop nodes.

The transmitter apparatus 102 comprises a polarization dithering unit 104 connected in series between an output of an optical transmitter unit 106 and a transmission fiber 108. The transmitter unit 106 and the dithering unit 104 are optically connected, however the length of the optical fiber between them is negligible compared to the length of the transmission fiber 108. Note that in WDM systems, it is possible to use one dithering unit 104 for each channel, or preferably only one dithering unit 104 for all the channels, where the dithering unit 104 is located after a WDM multiplexer (not shown). However, in embodiments where the communications network transmits more than one channel along the transmission fiber 108, there is one dithering unit 104 per channel in the transmitter apparatus 102, but not necessarily all channels are polarization dithered. This may, for example, apply to a control channel that does not require a significant bandwidth, and to situations where there is no essential need to achieve high data rates over the control channel. This is also applicable to embodiments where the multiplexer does not multiplex all the channels. Consequently, not all channels are polarization dithered.

The location of the dithering unit 104 close to the transmitter unit 106 provides important benefits. Polarization dithering is a modulation of initial State Of Polarization (SOP). Therefore, it operates properly if the dithering unit 104 is applied to the signal before it is output to the fiber 108. If the dithering unit 104 is located at the RX side, the dithering unit 104 will not work (there is a 50% probability that the compensator works in parallel mode, and a 50% probability that the compensator works in minimization mode). Locating the dithering unit 104 in the middle of the link reduces its effectiveness.

As seen in FIG. 1, positioning the dithering unit 104 between the output of the optical transmitter unit 106 and the fiber 108 helps to mitigate the effect of Polarization Mode Dispersion (PMD) of the transmission fiber 108 that links the optical transmitter 102 and the optical receiver 112 apparatuses. This is because the network 100 further comprises a Polarization Mode Dispersion Compensator (PMDC) 110 connected between the end of the transmission fiber 108 and an input of the optical receiver apparatus 112.

Figure 2:
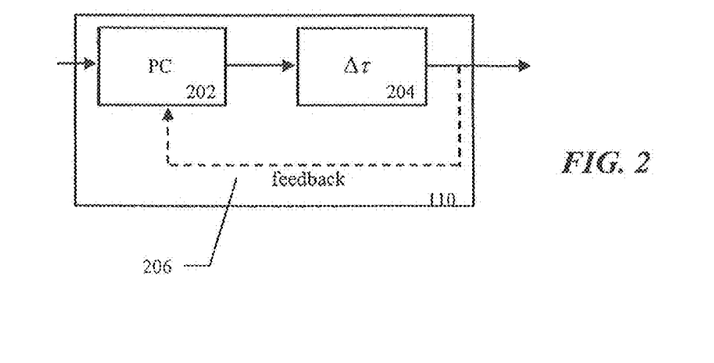
FIG. 2 is a diagram illustrating a Polarization Mode Dispersion Compensator for use in an optical communications network according to one embodiment of the present invention.

In a preferred embodiment, seen in FIG. 2, the PMDC 110 comprises a Polarization Controller 202, a delay unit 204, and a feedback signal line 206. The delay unit 204 provides, preferably, a fixed delay $\Delta\tau$ between two orthogonal SOP. The feedback signal line 206 provides a feedback signal that is extracted at the receiver apparatus 112 and then input to the Polarization Controller 202. PMDC 110, and specifically the Polarization Controller 202, compensates for the Polarization Mode Dispersion of the transmission fiber 108 on the receive side based on the received feedback signal. The feedback signal may be, for example, an eye-opening signal, or a pre-Forward Error Correction (FEC) Bit error ratio, or the intensity of a part of the electrical spectrum of a detected signal.

Figure 3:
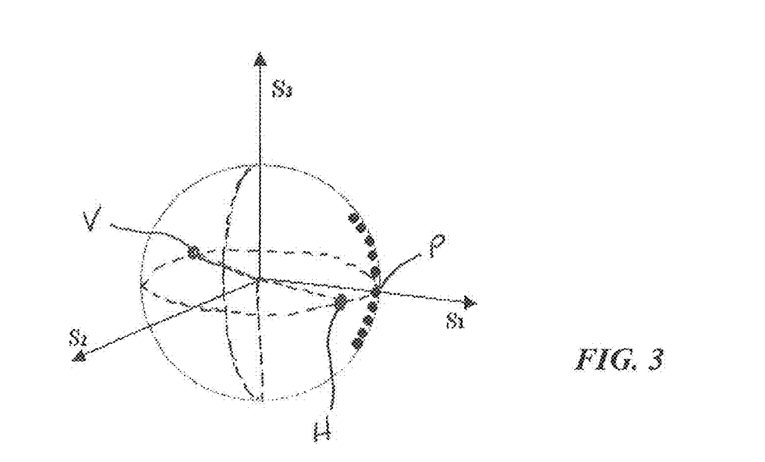
FIG. 3 is a diagram illustrating an example of variations of the input of the transmission Stokes vector on Poincare sphere (dotted line).

As previously stated, in the prior art, the Polarization Mode Dispersion Controller 110 are prone to lock to unstable conditions (i.e. situations where the PMDC starts in a "parallel" mode, and after some time, instantaneously switches to a "minimization" mode). However, modifying the transmission system by introducing the polarization dithering unit 104 between the transmitter 106 and the transmission fiber 108 stabilizes the PMDC 110. When the Stokes vector of the signal's State Of Polarization varies with time, this can be viewed as a trajectory on the Poincare sphere as illustrated in FIG. 3. The Poincare sphere provides a convenient way of representing polarized light and predicting how any given retarder will change the polarization form. The upper and lower poles represent left and right-circularly polarized light. Points on the equator indicate linear polarization. Other points on the sphere represent elliptical polarization. An arbitrarily chosen point H on the equator designates horizontal polarization, and the diametrically opposite point V designates vertical polarization. A general point P on the surface of the (unit radius) Poincare sphere is specific in terms of the longitude and the latitude.

Figure 4A:
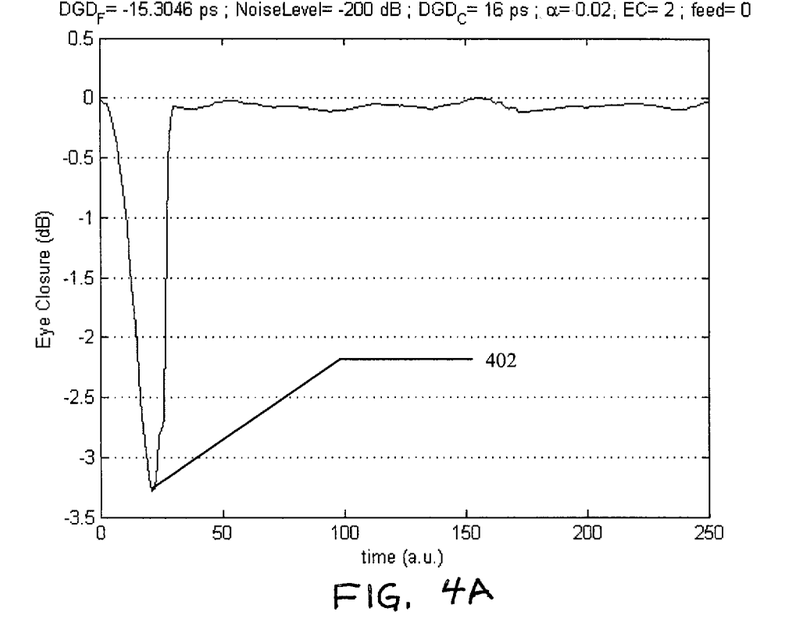
FIGS. 4A-4B are diagrams illustrating eye closure evolution in dB.
Figure 4B:
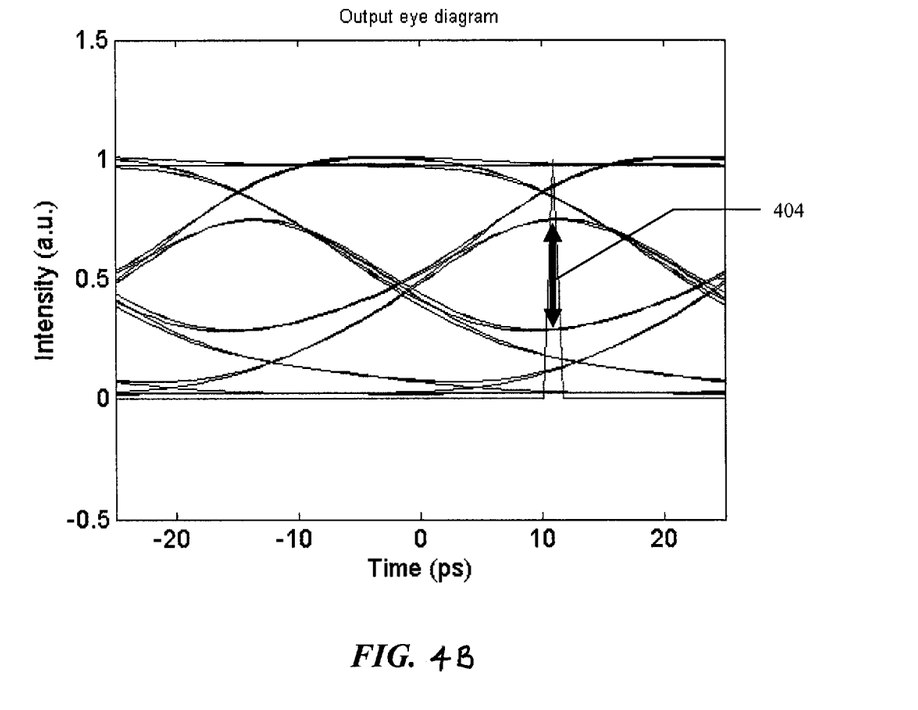

The inventors carried out computer simulations to determine effectiveness of this approach. It these simulations, a 40 Gbit/s nonreturn-to-zero (NRZ) signal with no chirp propagating along a fiber with an average differential group delay DGD=8.0 ps ($\approx T_{bit}/3$) was assumed, where $T_{bit}$ is bit time. Additionally, in order to speed the simulation, it was assumed that a 64-bit pattern is propagated along the fiber, using the wave-plate model. Before outputting the signal to the transmission fiber, the signal passes through the dithering unit 104. The dithering unit 104 introduces a variation of the signal's State Of Polarization (SOP) that is given by an arc of a circle in the Stokes domain, as shown in FIG. 3. With the polarization dithering, the variation of initial SOP is limited only to the arc of a circle, and the signal is not fully depolarized. It could be expected that a complete polarization scrambler prevents the dynamic limitations of PMDCs. The inventors found, however, that this also produces a relevant jitter, which cannot be tolerated in a real system (FIGS. 4A-4B). However, a low, controlled polarization variation can be enough to suppress the PMDC instabilities, while introducing no significant jitter.

In one embodiment, at the receiver end, the PMDC 110 is a one-stage Polarization Mode Dispersion Controller with a fixed delay provided by the delay unit 204 and the Polarization Controller 202 (i.e. it has two degrees of freedom). The receiver is modelled as a fast photodiode followed by low-pass Bessel filter ($4^{th}$ order, 28 GHz bandwidth). An eye opening signal is used as the feedback signal. Neither electrical nor optical noise is added; and therefore, the eye opening signal is a preferred feedback signal.

FIGS. 4A-4D show two examples of curves, obtained without (FIGS. 4A-4B) and with (FIGS. 4C-4D) polarization dithering, and with $DGD_f$=15.3 ps and $DGD_c$=16 ps, and input state of polarization was close to one principal state of polarization. Where $DGD_f$ stands for differential group delay of the fiber and $DGD_c$ stands for differential group delay of the PDMC. The differential group delay of the PDMC is introduced by the delay unit 204.

In FIG. 4A, eye closure evolution in dB in the case of a prior art transmitter is illustrated (i.e. an optical transmitter with no polarization dithering). Here, after initial locking, the eye suddenly suffers from a significant penalty of about 3.5 dB, 402. In FIG. 4B, the corresponding eye diagram is shown. The penalty of 3.5 dB results in closing the eye, 404, and indicates dynamic limitations of the PMDCs. Even worse results are obtained when, due to the statistical variations, the fiber reaches higher $DGD_f$ values.

Figure 4C:
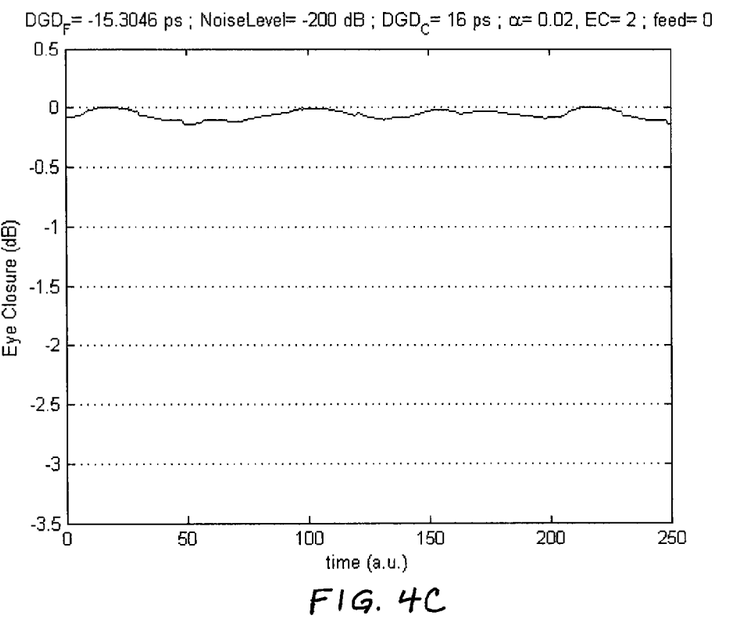
FIGS. 4C-4D are diagrams illustrating eye closure evolution in dB in one embodiment of the present invention.
Figure 4D:
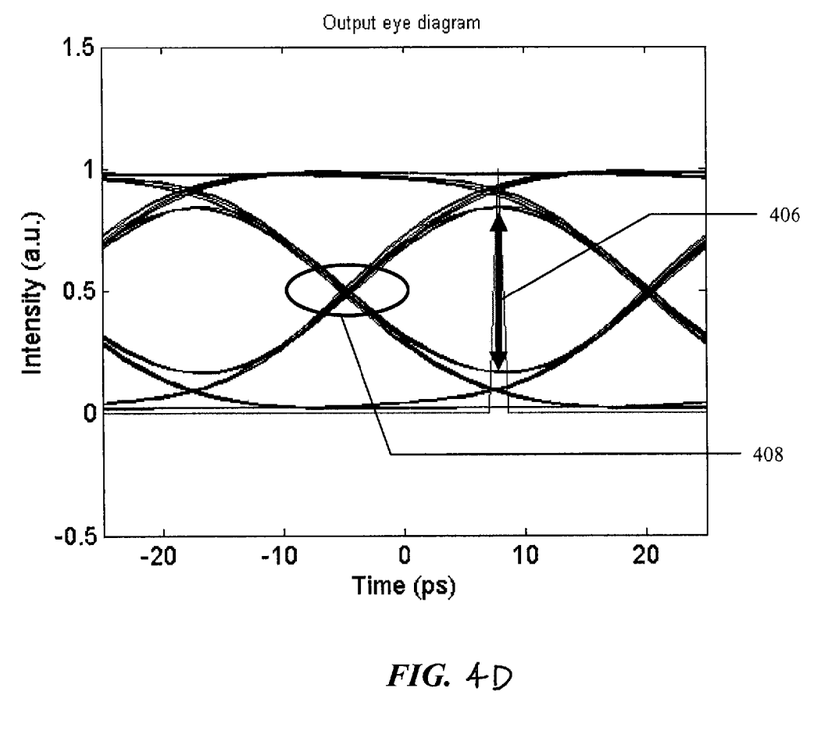

When polarization dithering (also referred to as arc dithering) is introduced, the eye diagram is not affected by the penalty—this is illustrated in FIG. 4C, and by 406 in FIG. 4D. On the other hand, a presence of limited jitter, 408, is noticed. Ideally the sampling instants would always occur at the centre of a data bit time, equidistant between two adjacent edge transition points. Jitter however changes the edge positions with respect to the sampling point and can affect the performance of the opto-electronic high speed receivers.

It can be seen that, when the signal is not polarization-dithered, the time delay it takes to travel through a PMD-affected fiber depends on the fiber $DGD_f$ and its initial SOP. As an example, if the signal is first injected with its SOP along one of the principal states of polarization (PSP) of the fiber and then along the other PSP, it has two different values of the group delay whose difference is the $DGD_f$. Changes of input SOP, coupled with PMD, can thus produce a non-constant arrival time of the digital symbols.

It is emphasized that choosing the speed of the polarization dithering determines this delay-modulation, and this is very critical. If the dithering is slow, the SOP changes are slow (e.g. kHz), and a typical receiver would not be affected significantly by the different group delay. However, in that case, the benefit onto the PMDC would disappear: to be effective, polarization dithering should change input SOP at a faster speed than the speed of the electronics that is implemented to extract a feedback signal (MHz or higher). Therefore, in a preferred embodiment, a fast polarization dithering is used. In this case, however, the polarization dithering combines with the residual PMD (the part of the fiber PMD that is not compensated by the PMDC), and produces jitter. This jitter can dramatically affect the receiver performance by closing the eye diagram and not allowing the clock recovery to extract a good clock signal from the data. The inventors found that an arc dithering of around 1 rad in the Stokes sphere is able to suppress the instability of a one stage PMDC in all tested cases, and at the same time, produce a negligible increase of time jitter even in cases when the DGD of the fiber ($DGD_f$) is different than that of the PMDC ($DGD_c$). This shows the advantage of the present invention, which can handle a DGD value that changes with time, temperature, wavelength and deployment condition.

Figure 5:
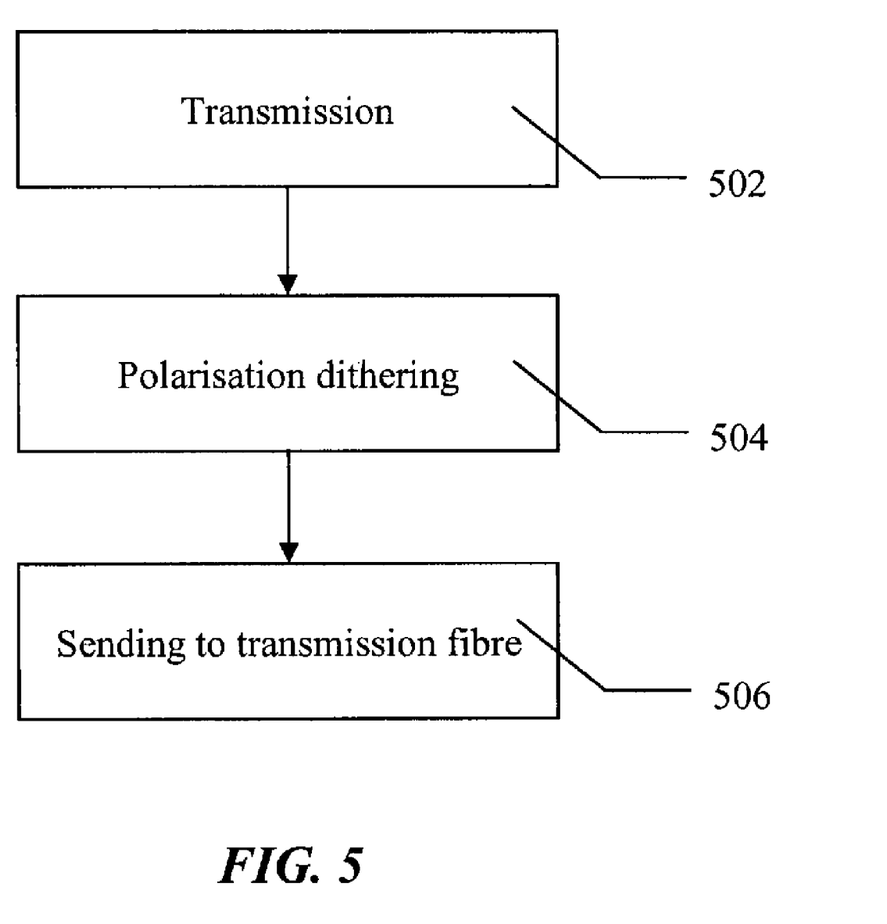
FIG. 5 is a flowchart illustrating a method of transmitting optical signals according to one embodiment of the present invention.

With reference to FIG. 5 one embodiment of a method of transmitting an optical signal in an optical communications network 100 is presented. The method comprises a step of polarization dithering (box 504) of the optical signal output from the optical transmitter unit 106 (box 502). In the next step the dithered signal is sent to the transmission fiber 108 (box 506).

In embodiments where the communications network 100 transmits more than one channel along the transmission fiber 108, the step of polarization dithering (box 504) is performed on individual channels. In some embodiments, all the channels transmitted along the fiber are individually dithered. In other embodiments, only some of these channels are polarization dithered.

In embodiments where communications network 100 transmits more than one channel along the transmission fiber 108, the method comprises multiplexing the channels followed by the step of polarization dithering (box 504) of the multiplexed signal. Again, two alternative implementations are possible. In one implementation, all channels are multiplexed and then polarization dithering is performed on them. In another implementation, only some of the channels to be transmitted along the fiber are multiplexed and then polarization dithered.

Those skilled in the art will readily appreciate that the present invention is applicable to Wavelength Division Multiplexing (WDM), Dense Wavelength Division Multiplexing (DWDM) or Coarse Wave Division Multiplexing (CWDM) systems, but it can also be used in other optical systems providing high-speed communication including single channel systems.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An optical transmitter apparatus for use in an optical communications network, the optical transmitter apparatus comprising:
   an optical transmitter unit;
   a transmission fiber; and
   a polarization dithering unit connected in series between an output of the optical transmitter unit and the transmission fiber, and configured to introduce polarization variation to stabilize the operation of a Polarization Mode Dispersion Compensator operating at a receive end of the transmission fiber;
   the Polarization Mode Dispersion Compensator comprising:
      a Polarization Controller;
      a delay unit; and
      a feedback signal line configured to provide a feedback signal detected at an input to the Polarization Controller; and
      wherein the dithering unit is configured to modulate a state of polarization of an input signal so that the state of polarization modulation varies on a time-scale that is shorter than the time-scale over which the feedback signal of the Polarization Mode Dispersion Compensator is extracted.

2. The apparatus of claim 1 wherein for a communications network transmitting more than one channel along the transmission fiber, the transmitter apparatus comprises one dithering unit per channel.

3. The apparatus of claim 1 wherein for a communications network transmitting more than one channel along the transmission fiber, the optical transmitter apparatus further comprises a multiplexer connected to the optical transmitter unit, and the polarization dithering unit is connected to an output of the multiplexer.

4. An optical communications network comprising:
   a receiving apparatus;
   an optical transmission fiber;
   a transmitter apparatus comprising:
      an optical transmitter unit;
      a polarization dithering unit connected in series between an output of the optical transmitter unit and the transmission fiber, and configured to introduce polarization variation to stabilize the operation of a Polarization Mode Dispersion Compensator connected between an end of the transmission fiber and an input of the receiving apparatus;
   the Polarization Mode Dispersion Compensator comprising:
      a Polarization Controller;
      a delay unit; and
      a feedback signal line configured to provide a feedback signal detected at an input to the Polarization Controller; and
      wherein the dithering unit is configured to modulate a state of polarization of an input signal so that the state of polarization modulation varies on a time-scale that is shorter than the time-scale over which the feedback signal of the Polarization Mode Dispersion Compensator is extracted.

5. The network of claim 4 wherein the feedback signal comprises one of an eye-opening signal, and a pre-Forward Error Correction (FEC) bit error ratio.

6. The network of claim 4 wherein the delay unit is configured to add a fixed delay to an optical signal.

7. The network of claim 4 wherein the transmitter apparatus comprises one dithering unit per channel if the network transmits more than one channel along the transmission fiber.

8. The network of claim 4 wherein the transmitter apparatus further comprises a multiplexer connected to the optical transmitter unit, and wherein the dithering unit is connected to an output of the multiplexer if the network transmits more than one channel along the transmission fiber.

9. The network of claim 4 wherein the network comprises at least one of a Wavelength Division Multiplex network, a Dense Wavelength Division Multiplex network, or a Coarse Wavelength Division Multiplex network.

10. A method of transmitting an optical signal in an optical communications network, the method comprising:
    outputting an optical signal from an optical transmitter unit;
    polarization dithering the optical signal;
    sending the dithered signal to a transmission fiber; and
    compensating the polarization dithered signal for polarization mode dispersion in a Polarization Controller of a Polarization Mode Dispersion Compensator by modulating a state of polarization of an input signal so that the state of polarization modulation varies on a time-scale that is shorter than the time-scale over which a feedback signal of the Polarization Mode Dispersion Compensator is extracted.

11. The method of claim 10 wherein polarization dithering the optical signal is performed on individual channels if the communications network transmits a plurality of channels along the transmission fiber.

12. The method of claim 10 wherein if the communications network transmits a plurality of channels along the transmission fiber, the method comprises:
    multiplexing the plurality of channels to generate a multiplexed signal; and
    polarization dithering the multiplexed signal.

* * * * *

UNITED STATES PATENT AND TRADEMARK OFFICE
CERTIFICATE OF CORRECTION

PATENT NO.         : 8,036,536 B2                                           Page 1 of 1
APPLICATION NO.    : 12/126419
DATED              : October 11, 2011
INVENTOR(S)        : Ciaramella et al.

It is certified that error appears in the above-identified patent and that said Letters Patent is hereby corrected as shown below:

In Column 1, Line 9, delete "entitiled," and insert -- entitled, --, therefor.

In Column 2, Line 11, delete " $\vec{S}$ and $\vec{\Omega}$ are " and insert -- $\vec{S}$ and $\vec{\Omega}$ are --, therefor.

In Column 2, Line 14, delete " $\vec{\Omega}$ is " and insert -- $\vec{\Omega}$ is --, therefor.

In Column 2, Line 16, delete " $if |\vec{\Omega}|$ " and insert -- $if |\vec{\Omega}|$ --, therefor.

In Column 5, Line 41, delete "PDMC." and insert -- PMDC. --, therefor.

In Column 5, Line 41, delete "PDMC" and insert -- PMDC --, therefor.

Signed and Sealed this
Seventeenth Day of April, 2012

David J. Kappos
*Director of the United States Patent and Trademark Office*